(12) United States Patent
Pitzel et al.

(10) Patent No.: US 7,844,963 B2
(45) Date of Patent: *Nov. 30, 2010

(54) SYSTEM AND METHOD FOR UPDATING INFORMATION VIA A NETWORK

(75) Inventors: Brad Pitzel, Seattle, WA (US); Stanizlav Bobrovskiy, Lake Forest Park, WA (US)

(73) Assignee: RealNetworks, Inc., Seattle, WA (US)

( * ) Notice: Subject to any disclaimer, the term of this patent is extended or adjusted under 35 U.S.C. 154(b) by 1042 days.

This patent is subject to a terminal disclaimer.

(21) Appl. No.: 11/419,700

(22) Filed: May 22, 2006

(65) Prior Publication Data

US 2006/0265471 A1    Nov. 23, 2006

Related U.S. Application Data

(63) Continuation of application No. 09/318,438, filed on May 25, 1999, now Pat. No. 7,062,765.

(51) Int. Cl.
*G06F 9/44* (2006.01)

(52) U.S. Cl. ............ 717/171; 717/169; 717/172; 717/173; 717/175; 717/177; 717/178; 709/201; 709/203; 709/220

(58) Field of Classification Search ........... 717/175, 717/176, 169, 171–173, 177–178; 709/203, 709/220, 201

See application file for complete search history.

(56) References Cited

U.S. PATENT DOCUMENTS

| | | | | |
|---|---|---|---|---|
| 5,544,320 A | * | 8/1996 | Konrad | 709/203 |
| 5,696,901 A | * | 12/1997 | Konrad | 709/203 |
| 5,999,944 A | * | 12/1999 | Lipkin | 1/1 |
| 6,052,720 A | * | 4/2000 | Traversat et al. | 709/220 |
| 6,105,036 A | * | 8/2000 | Henckel | 1/1 |
| 6,128,656 A | * | 10/2000 | Matchefts et al. | 709/223 |
| 6,151,643 A | * | 11/2000 | Cheng et al. | 710/36 |
| 6,314,565 B1 | * | 11/2001 | Kenner et al. | 717/171 |
| 6,463,473 B1 | * | 10/2002 | Gubbi | 709/225 |
| 6,546,554 B1 | * | 4/2003 | Schmidt et al. | 717/176 |

(Continued)

OTHER PUBLICATIONS

Title: Updating software and configuration data in a distributed communications network, author: Symborski, C.W.; dated: Apr. 13, 1988, source: IEEE.*

(Continued)

*Primary Examiner*—Chameli C Das
(74) *Attorney, Agent, or Firm*—AEON Law; Adam L. K. Philipp

(57) ABSTRACT

The present invention includes a system and a method for updating components in a client computer. The invention includes a method for upgrading software for various users, each of the users having diverse hardware and software configurations. The invention includes a method for automatically determining the hardware and software configuration of the client computer without user intervention. To begin the upgrade, the client computer reads a configuration file that identifies the components for downloading. Upon receipt of the configuration file, the client computer determines the hardware and software configuration of the client computer. The client computer automatically communicates with a component server via a network and requests one or more components for downloading to the client computer based upon the configuration file and the hardware and software conditions of the client computer.

22 Claims, 7 Drawing Sheets

U.S. PATENT DOCUMENTS

| | | | |
|---|---|---|---|
| 6,629,138 B1* | 9/2003 | Lambert et al. | 709/224 |
| 6,918,113 B2* | 7/2005 | Patel et al. | 717/178 |
| 6,959,320 B2* | 10/2005 | Shah et al. | 709/203 |
| 7,062,765 B1* | 6/2006 | Pitzel et al. | 717/177 |
| 7,305,669 B2* | 12/2007 | Roush | 717/170 |
| 7,376,945 B1* | 5/2008 | Kakumani et al. | 717/171 |
| 7,526,775 B2* | 4/2009 | Pham et al. | 719/321 |
| 2005/0022177 A1* | 1/2005 | McCaleb et al. | 717/171 |
| 2008/0134018 A1* | 6/2008 | Kembel et al. | 715/234 |
| 2008/0163202 A1* | 7/2008 | Kembel et al. | 717/178 |
| 2009/0077548 A1* | 3/2009 | Kelley et al. | 717/171 |
| 2009/0150882 A1* | 6/2009 | Dechovich et al. | 717/178 |
| 2009/0282403 A1* | 11/2009 | Poole et al. | 717/178 |

OTHER PUBLICATIONS

Title: Management of distributed applications in large networks, author: Flavin et al, source: IEEE, dated: Jan. 8, 1988.*

* cited by examiner

SYSTEM AND METHOD FOR UPDATING INFORMATION VIA A NETWORK

CROSS-REFERENCE TO RELATED APPLICATIONS

This application is a continuation of U.S. patent application Ser. No. 09/318,438 filed on May 25, 1999, entitled SYSTEM AND METHOD FOR UPDATING INFORMATION VIA A NETWORK, with the named inventors Brad Pitzel and Stanislav Bobrovskiy, which is hereby incorporated in its entirety by reference.

BACKGROUND OF THE INVENTION

1. Field of the Invention

The field of the invention relates to transmitting computer programs and data to a computer via a network. More particularly, the invention relates to a system and method for updating computer programs and data over a computer network, the updating based upon client-specific information.

2. Description of the Related Art

In designing software, developers often need to customize computer programs to many varied hardware and software configurations, as well to other specific considerations. For example, computer programs are often customized toward a particular geographic speaking region. A computer user in France expects to see help menus and other information displayed in French instead of English. Further, for example, computer programs are often designed to operate under a particular operating system, or even a particular version of an operating system.

As improvements are made in a computer program, many of the users are interested in receiving and upgrading to the latest version of the computer program. With the advent of the Internet, it is now possible for users to almost instantaneously download and install such improvements on their computers.

Typically, the user visits an "update" server that hosts the improved computer programs. The update server presents to the user a list of the different versions of the computer programs that are available for installation. Due to the number of possible versions that are available for downloading, users are often confused and download the incorrect version of the requested software. Although the user may be able to readily identify that he is interested in a "French" version, the user may not know the version of an operating system. Another problem that is encountered is that even if the user knows which version is required for operation, the user may not know what other computer programs are required for proper operation of the upgrade. Disadvantageously, if the user chooses a version of computer program that is incompatible with his particular hardware and/or software configuration, possible damage can occur to the user's hardware and/or other software components.

Therefore, there is a need for a system and a method for automatically downloading an appropriate version of a computer program without user intervention. Further, the system and method should automatically determine the hardware and/or the software configuration of the client computer and select the appropriate version of the computer program.

SUMMARY OF THE INVENTION

The present invention has several aspects, no single one of which is solely responsible for its desirable attributes. Without limiting the scope of this invention as expressed by the claims which follow, its more prominent features will now be discussed briefly.

One embodiment of the invention includes a method of selecting components for installation on a computer, the method comprising receiving a request for the upgrade of one or more components, determining one or more system conditions regarding the computer, and identifying one or more components for installation on the computer based upon the request and the system conditions.

Another embodiment of the invention includes a computer system having a hardware and software configuration subject to change over time, the system comprising a first computer having one or more system resources, a second computer operably connected to the first computer, the second computer associated with one or more installable components, a configuration file that is readable by first computer, the configuration file identifying at least one of said one or more installable components, an upgrade manager executing on the first; computer, the upgrade manager configured to transmit information about the system resources of the first computer to the second computer, and an upgrade handler executing on the second computer, the upgrade 30 handler configured to transmit the location of one or more installable components from the second computer to the first computer based upon the contents of the configuration file and the system resources of the first computer.

Yet another embodiment of the invention includes a system for installing one or more components on a client computer, the system including a network, a client computer operably connected to the network, a configuration file identifying at least one of the components, a client computer for identifying or more client conditions, and a component server for receiving the client conditions and the configuration file from the client computer, the component server identifying the location of one or more components based upon the components identified by the configuration file and the client conditions.

Yet another embodiment of the invention includes a system for selecting components for installation on a computer, the system comprising means for receiving a request for the upgrade of one or more components, means for determining one or more system conditions regarding the computer, and means for identifying one or more components based upon the request and the system conditions.

Yet another embodiment of the invention includes a configuration file identifying one or more components for installation on a client computer, the configuration file comprising a plurality of component identifiers, each of the component identifiers identifying at least one of said one or more components, and an expiration time identifying a time by which the components must be installed in the client computer.

DETAILED DESCRIPTION OF THE PREFERRED EMBODIMENTS

Figure 1:
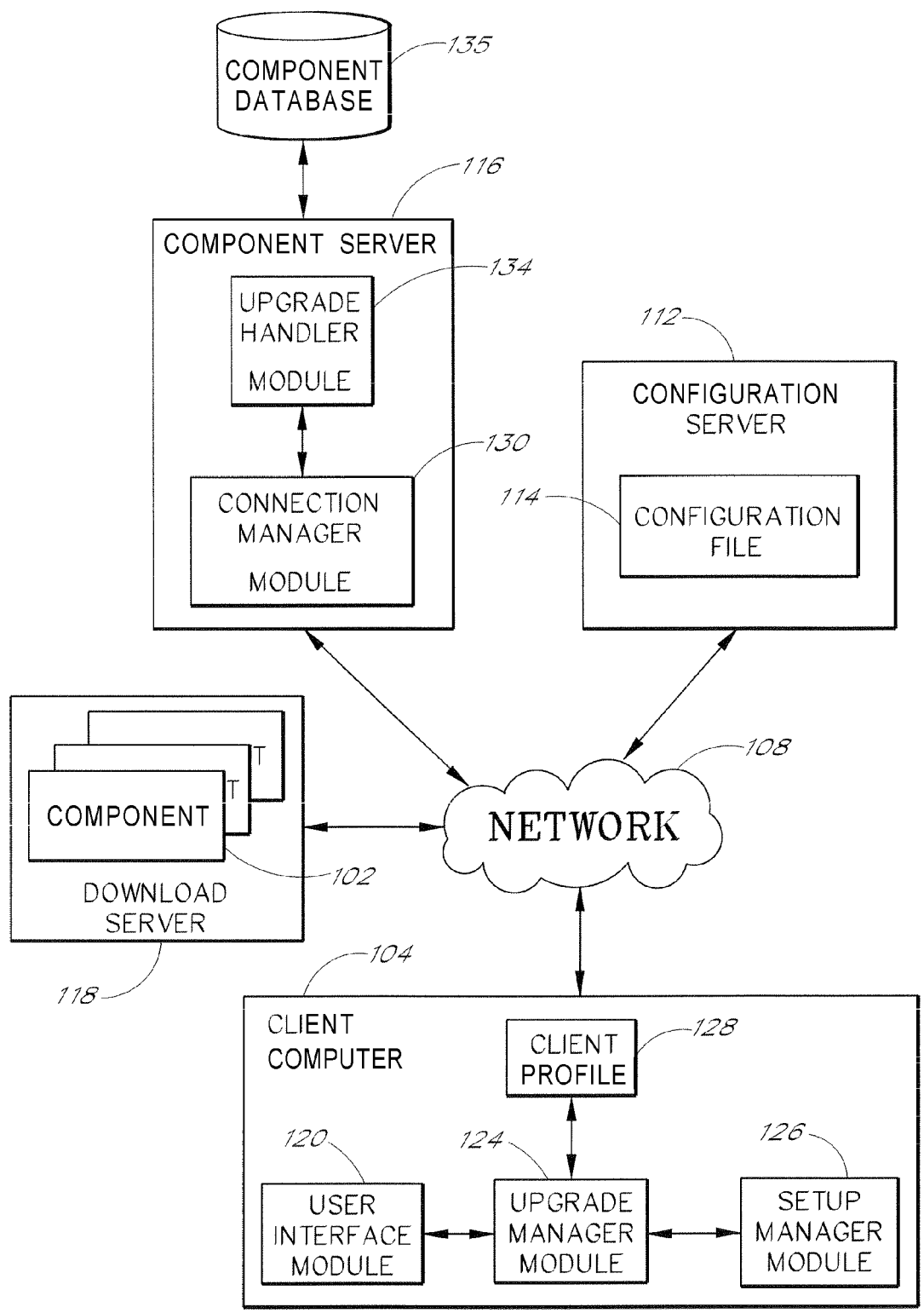
FIG. 1 is a high-level block diagram illustrating an architectural one embodiment of the present invention for updating a client computer.

FIG. 1 is a high-level block diagram illustrating an architectural overview of one embodiment of the present invention. The system is configured to install one or more components 102 on a client computer 104. As used herein, the term "components" can include any item of executable code or data, or group of such items, that is capable of being processed by a computer. As a non-limiting example, the components 102 can include: a computer program, a DLL, an object code module, a data file, a text file, a Hyper Text Markup Language (HTML) file. a graphic or multimedia file, a streaming media file, or other such program and/or data. The components 102 may optionally be stored in compressed form. Further, although only one client computer 104 is shown in FIG. 1, the present invention is capable for installing the components 102 on a plurality of client computers 104 numbering in the tens of thousands and upwards.

The client computer 104 is connected via a network 108 to a configuration server 112. Furthermore, the client computer 104 and the configuration server 112 are operably connected to a component server 116. The component server 116 identifies the location of each the components 102 may be installed on a client computer The client computer 104 is also connected via a network 108 to a download server The download server 118 maintains the components 102.

Optionally, the configuration server 112, the component server 116, the download server 118, or some combination thereof, may be integrated on a single computer platform. Further, it is noted the configuration server 112, the component server 116, and the download server 118 may not necessarily be located in the same room, building or complex. In fact, the configuration server 112, the component server 116, and the download server 118 could be located in different states or countries.

The client computer 104, the configuration server 112, the component server 116, and the download server 118 may each have any conventional general purpose single-or multi-chip microprocessor such as a Pentium® processor, a Pentium® Pro processor, a 805 1 processor, a MPSQ processor, a Power PC® processor, or an ALPHA® processor. In addition, the microprocessor may be any conventional special purpose microprocessors such as a digital signal processor or a graphics processor. Furthermore, the client computer 104, the configuration server 112, the component server 116, and the download server 118 may be desktop, sever, portable, hand-held, set-top, or any other desired type of configuration. Furthermore, the client computer 104, the configuration server 112, and the component server 116, and the download server 118 each may be used in connection with various operating systems such as: UNIX, LINUX, Disk Operating System (DOS), OS/2, Windows 3.X, Windows 95, Windows 98, and Windows NT.

The network 108 may include any type of electronically connected group of computers including, for instance, the following networks: Internet, Intranet, Local Area Networks (LAN) or Wide Area Networks (WAN). In addition, the connectivity to the network may be, for example, remote modem, Ethernet (IEEE 802.3), Token Ring (IEEE 802.5), Fiber Distributed Datalink Interface (FDDI) or Asynchronous Transfer Mode (ATM). As used herein, the Internet includes network variations such as public internet, a private internet, a secure internet, a private network, a public network, a value-added network, an intranet, and the like.

The client computer 104 comprises a user interface module 120, an upgrade manager module 124, and a setup manager module 126. As can be appreciated by one of ordinary skill in the art, each of the modules 120, 124, and 126 comprise various subroutines, procedures, definitional statements, and macros. In one embodiment of the invention, each of the modules 120, 124, and 126 are made available in a shareable dynamic link library. In another embodiment of the invention, each of the modules 120, 124, and 126 are separately compiled and linked into a single executable program. Therefore, the following description of each of the modules 120,124, and 126 is used for convenience to describe the functionality of the client computer 104. However, the processes that are undergone by each of the modules 120,124, and 126 may be arbitrarily redistributed to one of the other modules or combined together in a single module. Furthermore, the user interface module 120, the upgrade manager module 124, and the setup manager module 126 may be written in any programming language such as C, C++, BASIC, PASCAL, JAVA, and FORTRAN. C, C++, BASIC, PASCAL, JAVA, and FORTRAN are industry standard programming languages for which many commercial compilers can be used to create executable code.

The function of the modules in the client computer 104 is as follows. The user interface module 120 contains routines that for handling dialog boxes, message boxes, and other routines for presenting information to the user via a computer display (not shown). The upgrade manager module 124 handles the communication between the configuration server 112 and the component server 116. The upgrade manager module 124 also handles communication protocol, such as TCPIIP, between program servers. component downloading, and component authentication.

Furthermore, the upgrade manager module 124 determines the client conditions of the client computer 104 prior to downloading selected ones of the components 102. As used herein, the term "client conditions" includes, among other things: a preferred operating language, e.g., French, English, German, etc., the name of the operating system of the client computer 104, any version number that may be associated with the operating system, the existence of one or more other components of the client computer 104, and/or a user identification number. In one embodiment of the invention, the client conditions are permanently stored in a client profile 128. In another embodiment of the invention, the client profile 128 is dynamically generated upon each upgrade request by the user.

The setup manager module 126 handles the installation of the components 102 after the components are transmitted to the client computer 104. Furthermore, if necessary, the setup manager module 126 registers the downloaded components with the operating system on the client computer 104 and performs other installation housekeeping.

The configuration server 112 includes at least one configuration file 114. It is noted that the term "configuration server" is used for convenience to describe any computer that can maintain and transmit the configuration file 114. For example, the configuration server 112 can be any traditional "web server" that hosts media content for viewing by users. In one embodiment, the configuration server 112 includes a plurality of web pages that are viewable by a user at the client computer 104. The web pages are virtual documents that each have embedded links which link portions of the virtual pages to other virtual pages and other data. A user can traverse the virtual pages and download data by "clicking", with a mouse or other input device a predetermined portion of the virtual page.

According to this embodiment, at least one of the web pages includes a "download" hyperlink or icon that is associated with a configuration file 114. The configuration file 114 (FIG. 1) contains the configuration information for the installation of one or more components 102 on the client computer 104. For example, to advertise a word processing component, named "FOOBAR," a download hyperlink is displayed to the user "RECEIVE OUR LATEST PRODUCT, FOOBAR." If the user is interested in the FOOBAR component, the user can simply "click" on the phrase to download the configuration file 114 and initiate the download process.

In one embodiment of the invention, each of the configuration files 114 is associated with one of the components 102. The format of the configuration file 114 can be arbitrary, so long as it is readable by the client computer 104. One embodiment of the configuration file 114 is set forth below with reference to FIG. 2. The configuration file 114 is adapted such that it may be copied and stored on other computers. Advantageously, if one of the components 102 is freely distributed or is considered "shareware", the configuration file 114 that is associated with such component may be copied and distributed to others, and thereby enable others to download and install the software upon accessing the configuration file 114.

In one embodiment of the invention, before the configuration file 114 is transmitted from the configuration server 112 to the client computer 104, the configuration server 112 requests various items of information from the user for registration and demographic tracking purposes.

The component server 116 manages information about each of the components 102 that are installable on the client computer 104. To facilitate management and access to the information, the component information may be stored in a component database 135. In one embodiment of the invention, the components 102 are maintained on the component server 116. In another embodiment of the invention, the components 102 are maintained on one or more other component servers, such as the download server 118.

The component server 116 includes at least two modules: a connection manager module 130 and an upgrade handler module 134. Similar to the modules described above with reference to the client computer 104, the processes that are undergone by each of the modules 130 and 134 may be arbitrarily redistributed to one of the other modules, combined together in a single module, or made available in a shareable dynamic link library. In summary, the function of the modules is as follows. The connection manager 130 handles communication with multiple client computers 104. The connection manager 130 packages requested information for transmission across the network 108. The upgrade handler 134 is in operable communication with the connection manager module 130. The upgrade handler 134 identifies components to be downloaded to the client computer 104 based upon the contents of the client profile 128 and the contents of the configuration file 114.

Figure 2:
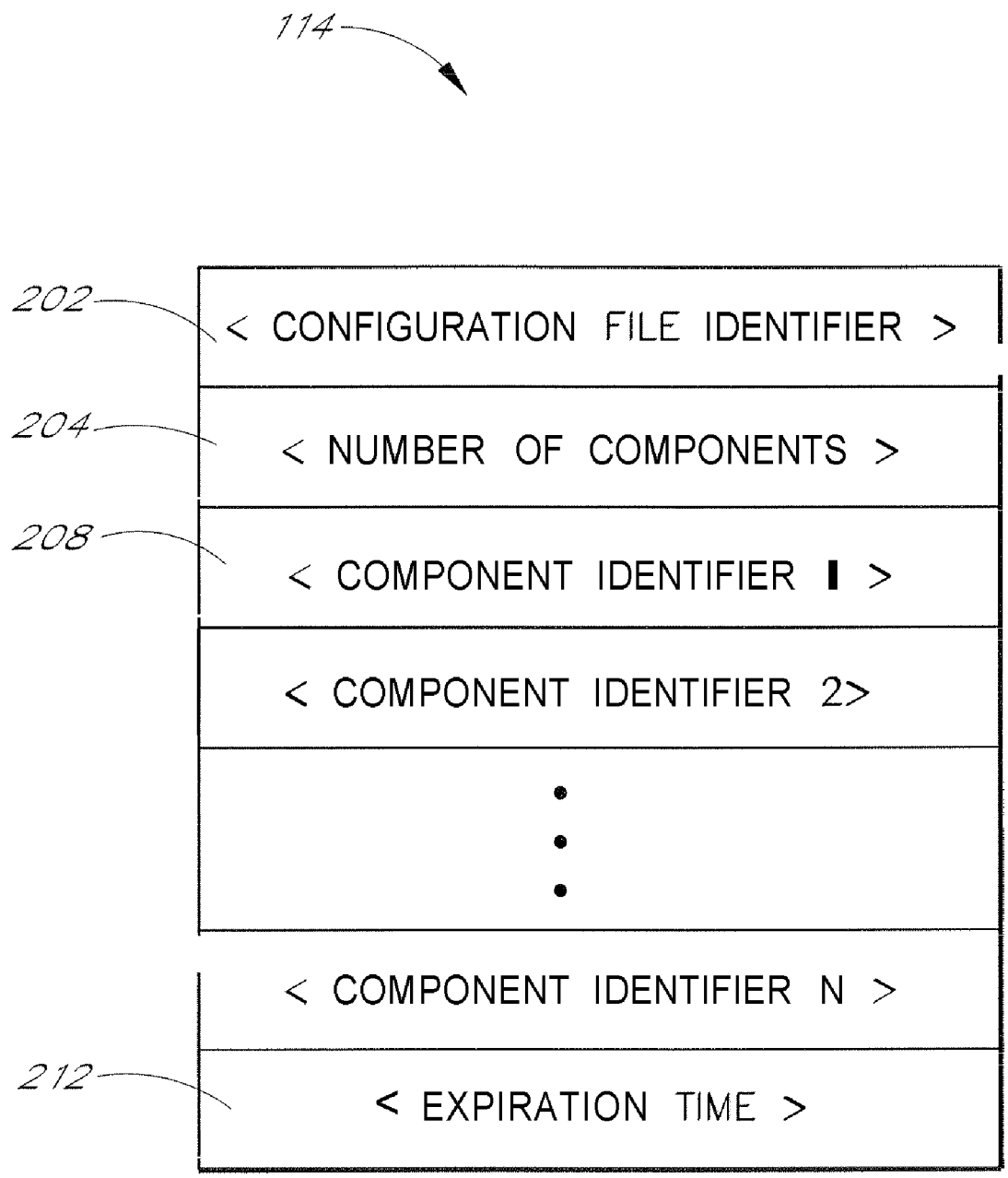
FIG. 2 is a block diagram illustrating a configuration file that is used to specify the components that are to be installed in the client computer shown in FIG. 1.

FIG. 2 is a block diagram illustrating the elements of one embodiment of the configuration file 114 (FIG. 1). The configuration file 114 identifies one or more components for downloading to the client computer 104 (FIG. 1). The configuration file 114 may be stored as any type of file, such as, for example: a text file, an IHTML file, or a Java Archive (JAR) file. It will be appreciated by one of ordinary skill in the art that the configuration file 114 may contain other information or have a different format.

The configuration file 114 includes a configuration file identifier 202. The configuration file identifier 202 identifies the format of the remainder of the configuration file 114. In one embodiment of the invention, at least two types of configuration files exist: a client readable configuration file (CR file) and a server configuration file (SR file). The CR file is configured to be read by the upgrade manager module 124 (FIG. 1), which parses its contents, and subsequently requests the components from the component server 116. The SR file is not parsed by the client computer 104 (other than reading the configuration file identifier), but is instead forwarded unparsed to the component server 116. Advantageously, to be contrasted with the CR file, any changes in format of the SR file requires no corresponding change to the upgrade manager module 124 on each of the client computers 104. This feature is especially advantageous when used in a system having thousands of client computers and wherein the upgrade manager module 124 of each of the client computers would otherwise have to be upgraded.

The configuration file 114 also contains a number of components field 204 and one or more component identifiers 208. The number of components field 204 identifies the total number of component identifiers 208 that are contained within the configuration file 114. Each of the component identifiers 208 identifies one or more of the components 102 (FIG. 1). The configuration file 114 also includes an expiration time field 212. The expiration time field 212 contains a time by which the installation process must be completed, otherwise, the component server 116 refuses to complete the transaction. Since the configuration file 114 may be copied to other computers, the use of the expiration time can advantageously be used to limit the lifespan of the configuration file 114, and prevent others from hosting the configuration file 114.

Figure 3:
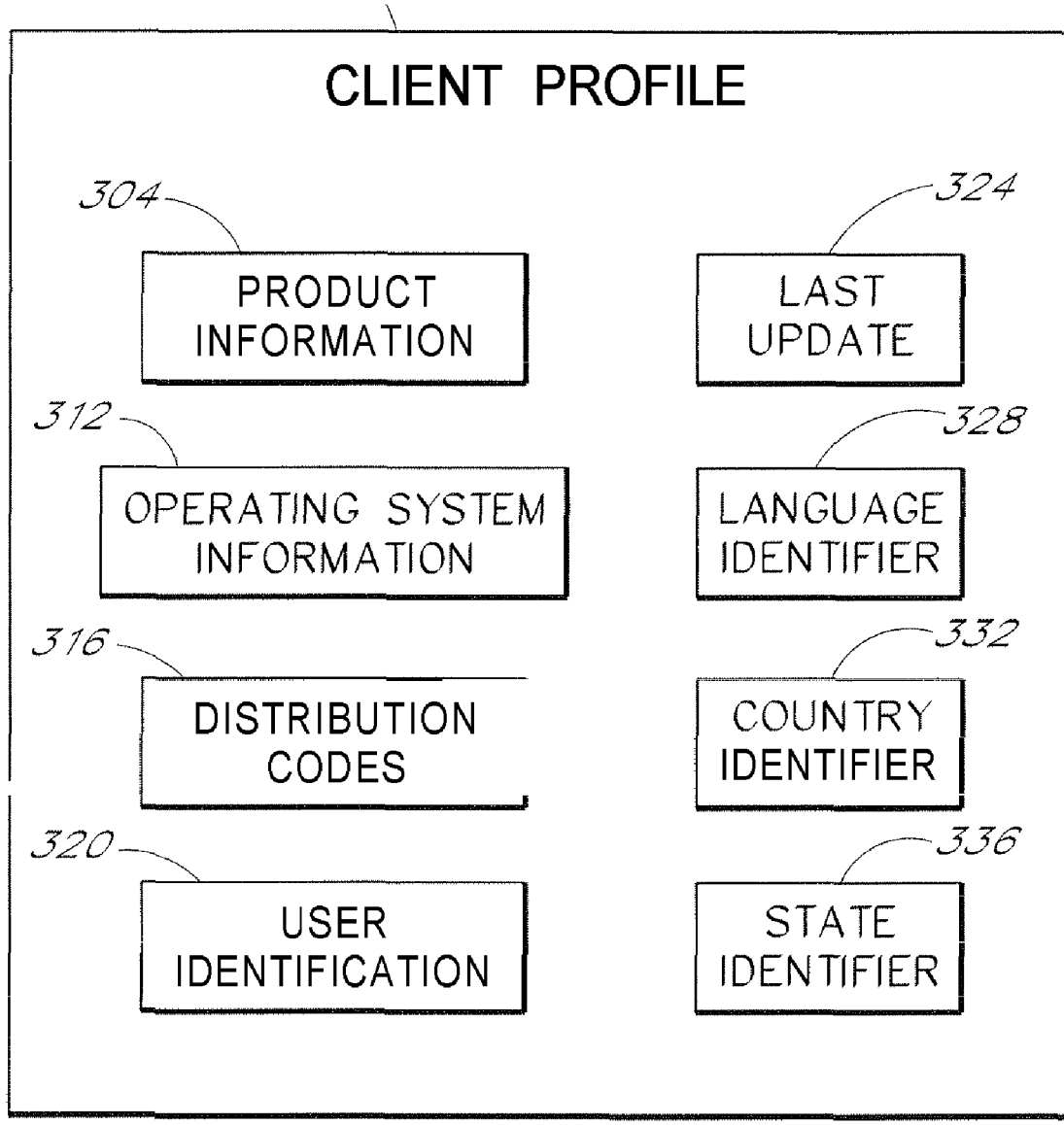
FIG. 3 is a block diagram illustrating a client profile that defines the client conditions of the client computer shown in FIG. 1.

FIG. 3 is a block diagram illustrating the contents of the client profile 128. The client profile 128 identifies client conditions, such that when one of the components 102 (FIG. 1) is designated for installation, a version of the component that is compatible with the client conditions may be selected. The client profile 128 includes a number of data field elements. The data field elements include: a product information field 304, an operating system information field 312, a distribution codes field 316, a user identification field 320, a last update field 324, a language identifier field 328, a country identifier field 332, and a state identifier field 336. It is noted that the data fields of the client profile are presented for exemplary purposes, and that selected data fields of the client profile 128 can be removed and that other data fields may optionally be added.

A description of each of the data fields in the client profile 128 is as follows. The production information field 304 contains product information about one or more components that are currently installed in the client computer 104 (FIG. 1). The product information may include a version number and a component serial number for each installed component. The operating system information field 312 identifies the type of operating system that is executing on the client computer 104 as well as any version information that is associated with the operating system. The distribution codes field 316 identifies the distributor of the currently installed components. The user identification field 320 contains a unique identifier that uniquely identifies the client computer 104. The last update field 324 contains a timestamp which identifies the last time the client computer 104 was updated.

The language identifier field 328 contains a language code that is associated with the client computer 104. For example, a language code of "1" can designate English, and a language code of "2" can designate French, and a language code of "3" can designate German. The country identifier field 332 identifies at least one country that is associated with the client computer 104. Lastly, the state identifier 336 designates one or more states that identify the client computer, e.g., California, Georgia, or Alaska.

Method of Operation

Figure 4:
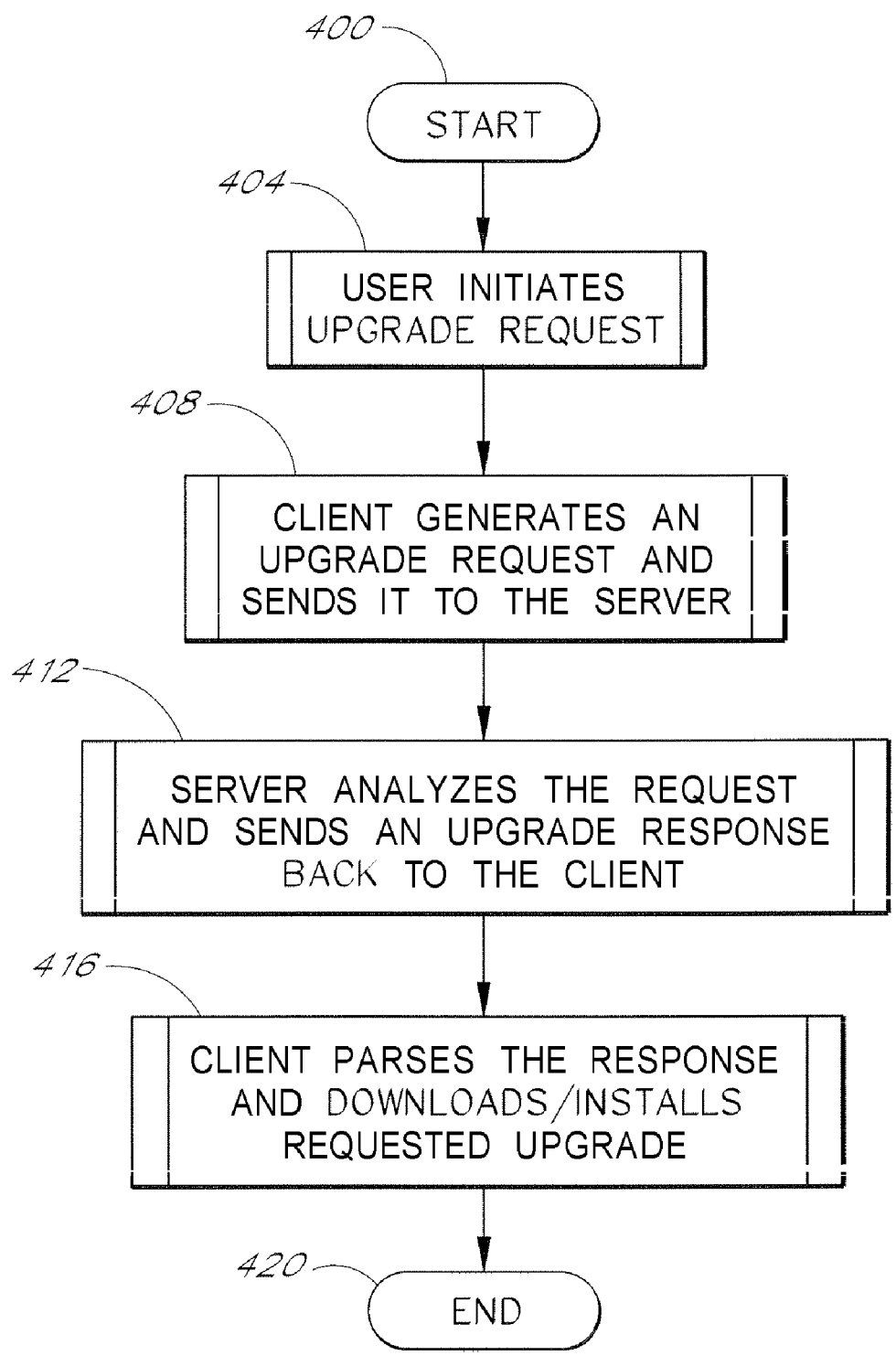
FIG. 4 is a high level flowchart illustrating a process for updating the client computer of FIG. 1, the process including receiving a user request, transmitting an upgrade request from the client computer to the server computer, analyzing the upgrade request, and installing one or more components identified in the upgrade request.

FIG. 4 is a flowchart illustrating a process for installing one or more components 102 on the client computer 104 (FIG. 1). After a starting at a step 400, the process moves to a step 404 wherein a user at the client computer 104 initiates an upgrade request. In one embodiment of the invention, at this step, the user accesses a configuration server 112 that is hosting one or more configuration files 114. The configuration server 112 includes a plurality of web pages, one of the pages having information about at least one of the components 102. In this embodiment, a portion of the screen display representing the component information is enabled as a hyperlink, and the user can click on the information that is hyperlinked to the configuration file 114 (FIG. 1). The clicking of the information causes the configuration server 112 to download the configuration file 114 to the client computer 104. However, it will be appreciated by one of ordinary skill that other methods exist for receiving the user upgrade request. For example, the user could type in the name of one or more of the components 102, or alternatively, using voice recognition software (not shown), verbally request one of the components 102.

Moving to a step 408, the client computer 404 generates an upgrade request which requests the location of one or more components. The process for generating an upgrade request is described below in further detail with reference to FIG. 5. However, in summary, the client computer 104 determines the client conditions and forwards the configuration file 114 and the client conditions to the component server 116. In one embodiment of the invention, the location of a component server 116 is specified in the configuration file 114. In another embodiment of the invention, the location of the component server 116 is predefined and stored by the upgrade manager module 124 (FIG. 1).

Continuing to a step 412, the component server 116 analyzes the upgrade request and sends an upgrade response message to the client computer 104 (FIG. 1). The process for analyzing the upgrade request is described below in further detail with reference to FIG. 6. However, in summary, the component server 116 uses the client conditions provided by the client computer 104 to determine an appropriate version of the component which was requested by the user. The component server 116 generates an upgrade response message which identifies the locations of the components requested by the client computer 104.

Next, at a step 416, the client computer 104 analyzes the upgrade response message to determine the location of requested components. Further, at this step, the client computer 104 downloads and installs the requested components. The process for downloading the requested components is described in further detail below with reference to FIG. 7. Moving to an end step 420, the installation process is complete.

Figure 5:
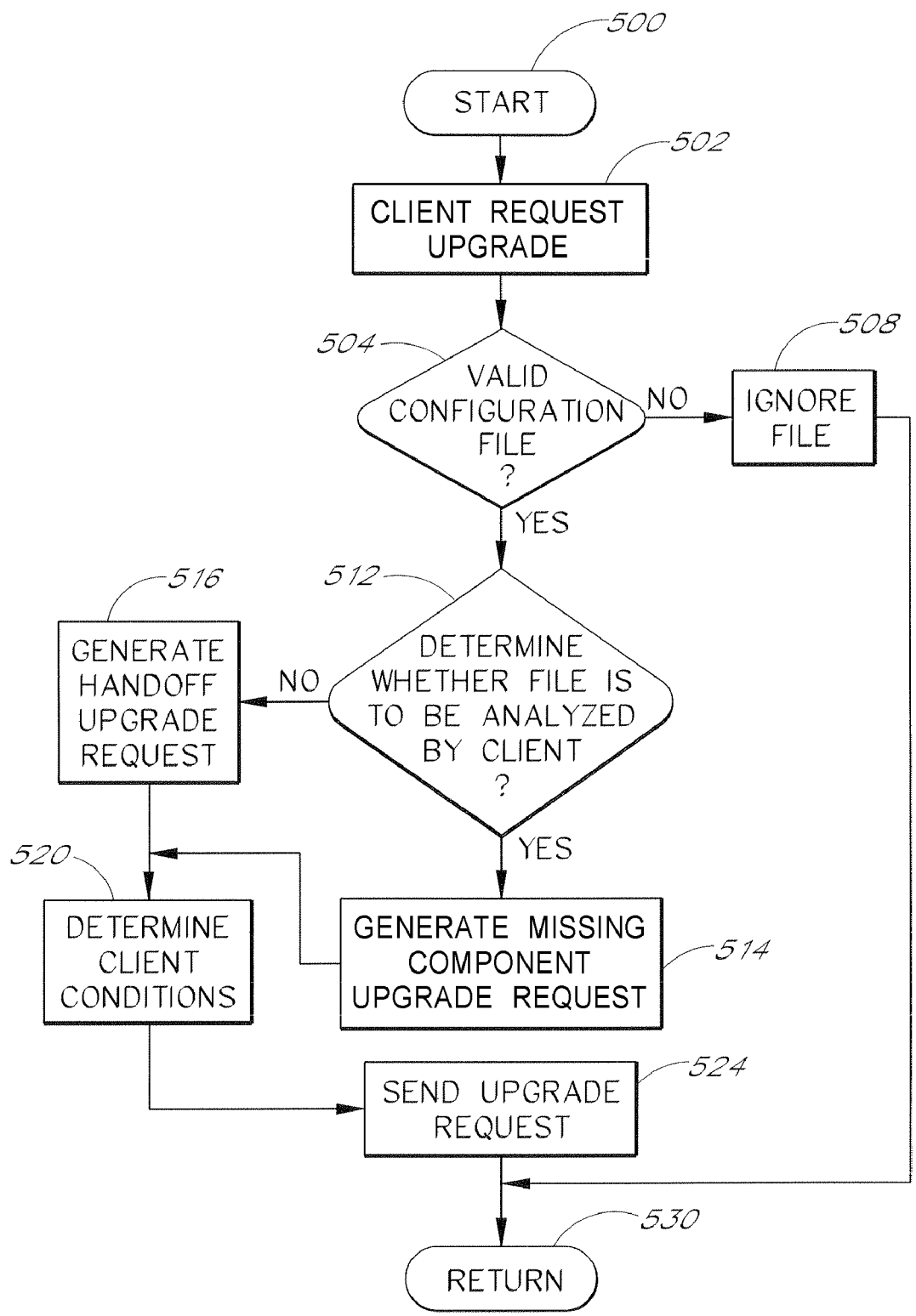
FIG. 5 is a flowchart illustrating in further detail the steps that occur in FIG. 4 with respect to transmitting the upgrade request.

FIG. 5 is a flowchart illustrating in further detail the process for transmitting an upgrade request message from the client computer 104 (FIG. 1) to the component server 116 (FIG. 1).

FIG. 5 shows in further detail the acts that occur in step 408 of the embodiment described in relation to FIG. 4. From a start step 500, the client computer 104 proceeds to a next step 502, wherein a user at the client computer 104 (FIG. 1) requests one or more of the components 102 for downloading. Further, at the step 502, the configuration server 112 (FIG. 1) transmits the configuration file 114 (FIG. 1) to the client computer 104.

Continuing to a decision step 504, the upgrade manager module 124 (FIG. 1) determines whether the configuration file 114 is a valid configuration file 114 (FIG. 5 1). In one embodiment of the invention, the upgrade manager module 124 checks the validity of the configuration file 114 by examining configuration file identifier 202 (FIG. 2) in the configuration file 114. However, it will be readily appreciated by one of ordinary skill that other methods exist for determining the validity of the configuration file 114. If the upgrade manager module 124 determines that the 10 configuration file 114 is not valid, for example, by determining that the configuration file identifier is of an unexpected value or format, the upgrade manager module 124 proceeds to a step 508. At the step 508, the upgrade manager module 124 stops processing the configuration file 114. The process flow then ends at a step 510.

Referring again to the decision step 504, if the upgrade manager module 124 (FIG. 1) determines that the configuration file 114 is valid, the upgrade manager module 124 proceeds to a decision step 512. At the decision step 512, the upgrade manager module 124 determines whether the configuration file 114 is to be analyzed by the client computer 104. In one embodiment of the invention, the upgrade manager module 124 determines whether the configuration file is to by analyzed by examining the configuration file identifier 202 (FIG. 2). If the upgrade manager module 124 determines that the configuration file is a CR file, i. e., readable by client computer 104, the upgrade manager module 124 proceeds to a step 514. At the step 514, the upgrade manager module 124 generates an upgrade request to the component server 116 (FIG. 1). The upgrade request identifies the components specified in the configuration file 114. Furthermore, the upgrade manager module 124 includes in the request the time stamp that is contained in the expiration time field 212 (FIG. 2).

However, referring again to the decision step 514, if the upgrade manager module 124 (FIG. 1) determines that the configuration file (FIG. 1 ) is a SR file, i.e., readable by the component server 116 (FIG. 1), the upgrade manager module 124, in a 30 step 516, generates a handoff upgrade request to be sent to the component server 116. At this step, unlike it does with the CR file, the upgrade manager module 124 does not analyze the contents of the SR file (FIG. 1). Advantageously, if the format of the SR file 114 is modified, the upgrade manager module 124 does not have to be upgraded so that it understands the format modifications (so long as the configuration file identifier can be read), since the upgrade manager module 124 merely forwards the upgrade request to the component server 116. This feature is especially advantageous as tens of thousands of client computers would otherwise have to be upgraded upon each modification of the configuration file 114 format.

From either the step 514 or the step 516, the upgrade manager module 124 proceeds to a step 520. At the step 520, the upgrade manager module 124 determines the client conditions. As discussed above, the term "client conditions" includes, among other things: a preferred language, the operating system of the client computer 104, the version of the operating system, the existence of one or more other components of the client computer 104, and/or a user identification number that is associated with the user.

In one embodiment of the invention, the client conditions are permanently stored in the client profile 128. In another embodiment of the invention, the client conditions are determined subsequent to each request by the user for one of the components 102. As will be appreciated by one of ordinary skill in the art, the client conditions can be obtained by a variety of methods. For example, in one embodiment of the invention, the user identification number can be a unique identifier that is associated with each upgrade manager module 124. In another embodiment of the invention, the user identification number can be a unique identifier that is associated with the microprocessor of the client computer 104. 111 yet another embodiment of the invention, the unique identifier is a unique identifier that is associated with the operating system of the client computer 104. As is seen from the foregoing examples, each of the client conditions may be derived from one or more of a variety of sources.

Proceeding to a step 524, the upgrade manager module 124 sends the upgrade request (generated in either the step 512 or the step 516) to the component server 116 (FIG. 1). In addition, the upgrade manager module 124 sends the client profile 128 to the component server 116. The process flow then ends at the step 510.

Figure 6:
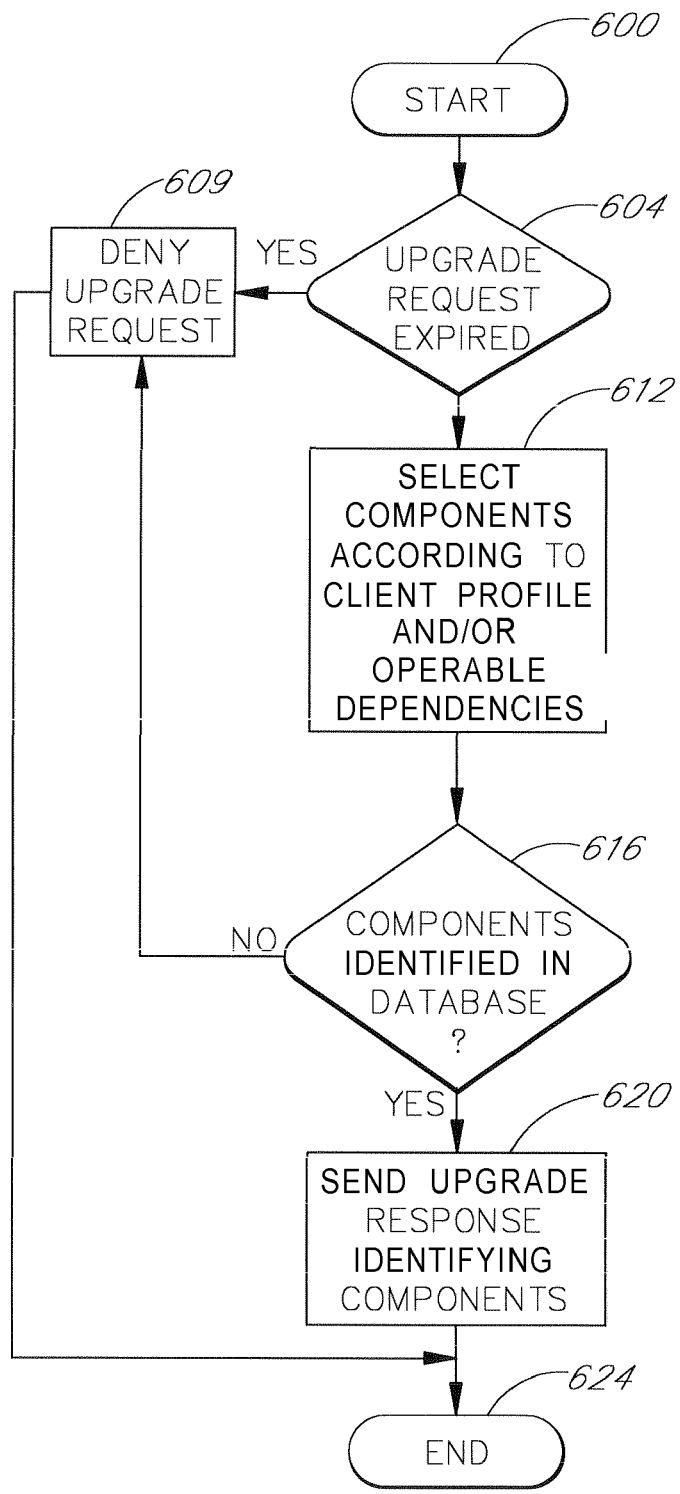
FIG. 6 is a flowchart illustrating in further detail the steps that occur in FIG. 4 with respect to analyzing the upgrade request.

FIG. 6 is a flowchart illustrating the process for responding to the upgrade request by the component server 116. FIG. 6 shows in further detail the acts that occur in step 412 of the embodiment described in relation to FIG. 4. At the step 600, the connection manager module 130 (FIG. 1) of the component server 116 (FIG. 1) has received an upgrade request from the client computer 104. Further, the connection manager module 130 has passed the upgrade request to the upgrade handler module 134 (FIG. 1).

From a start step 600, the upgrade handler module 134 proceeds to a decision step 604. At the decision step 604, the upgrade handler module 134 (FIG. 1) determines whether the upgrade request has expired. In one embodiment of the invention, the upgrade handler module 134 examines the timestamp that is included in the expiration time field (FIG. 2). In this embodiment, if the timestamp is earlier than the current time, the upgrade handler module 134 in the step 604 determines that the upgrade request has expired. If the upgrade request has expired, the upgrade handler module 134 proceeds to a step 609. At the step 609, the upgrade handler module 134 denies the upgrade request. The upgrade manager handler module 134 then sends a message to the client computer 104 to inform the client computer 104 that the request was denied. The process flow then proceeds to an end step 624 wherein the upgrade process is completed.

Referring again to the decision step 604, if the upgrade handler module 134 determines that the upgrade request has not expired, the upgrade handler module 134 proceeds to a step 612. At the step 612, the upgrade handler module 134 selects one or more of the components 102 for transmission to the client computer 104. The upgrade handler module 134 uses the client conditions to select components that are compatibly operable with the client computer 104. For example, the upgrade handler module 134 selects components and/or version of components 102 that are in a language which is preferred by the user, i. e., English, French, German.

In addition, the upgrade handler module 134 can optionally determine one or more additional components that are necessary for proper operation in addition to those components 102 requested by the client computer 104. For example, one of the requested components may be dependent on the existence of another component in the client computer 104 for proper operation. The upgrade handler module 134 can examine the client conditions to determine the existence of the necessary components, and if missing, supply these components in addition to the requested components. In one embodiment of the invention, the dependency information is stored in the component database 135. Further, the upgrade handler module 134 can identify other components that may be needed by the client computer 104.

Moving to a decision step 616, the upgrade handler module 134 (FIG. 1) determines whether the location of the requested components and those other computers that may be required can be identified in the component database 135 (FIG. 1). If the upgrade handler module 134 cannot identify the location of the selected components in the component database 135, the upgrade handler module 134 proceeds to the step 609 (discussed above) to deny the upgrade request. Otherwise, if the requested components are identified, the upgrade handler module 134 (FIG. 1) creates an upgrade response message to the client computer 104, identifying the location of the computers that are hosting the requested components. As was discussed above, in one embodiment of the invention, the components 102 may be stored on the component server 116. However, the components 102 may alternatively be stored one or more other server computers, such as the download server 118. The process flow then proceeds to the step 624 wherein the process 134 completes.

Figure 7:
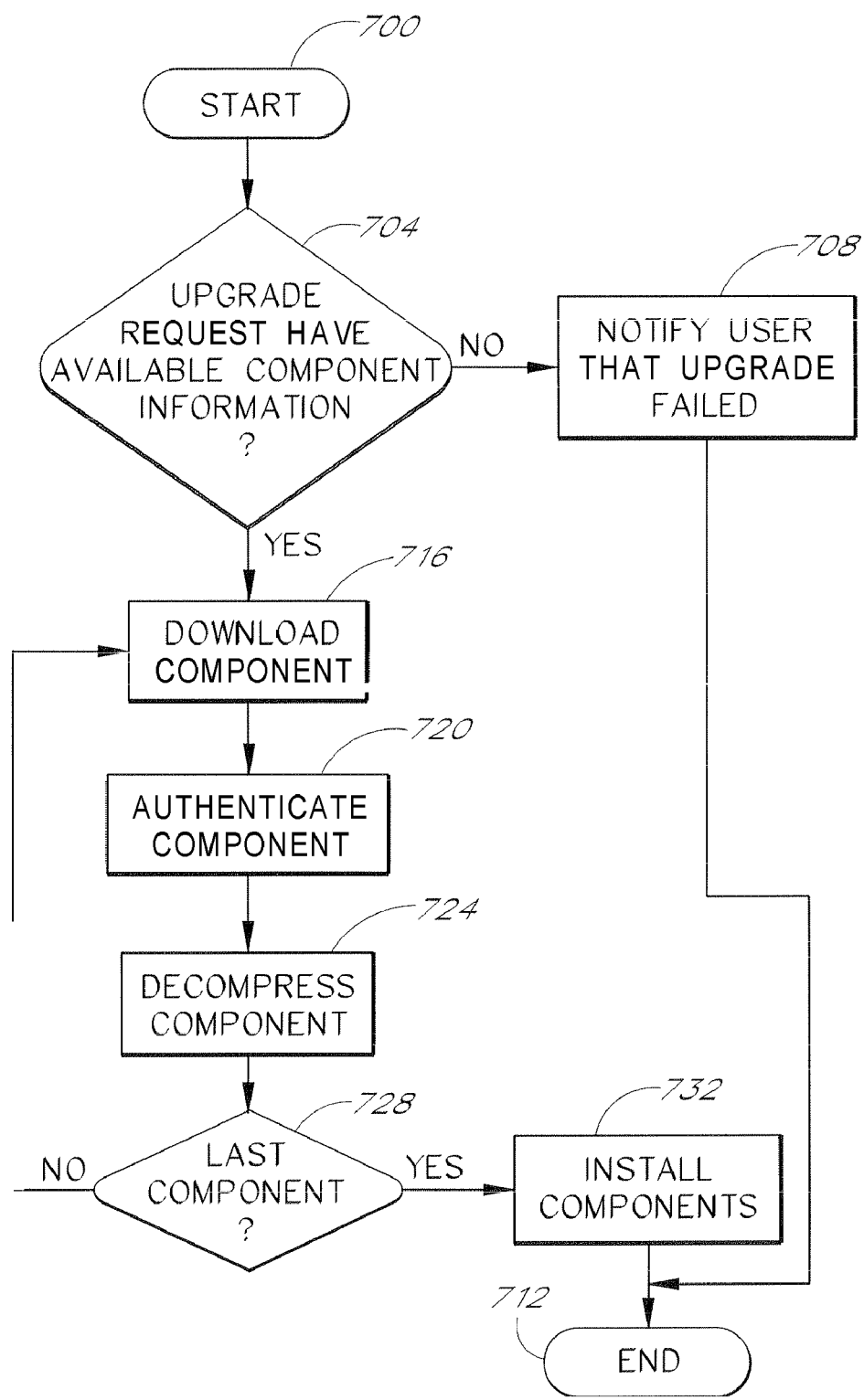
FIG. 7 is a flowchart illustrating in further detail the steps that occur in FIG. 4 with respect to installing the one or more components.

FIG. 7 is a flowchart illustrating the steps for installing the components that have been identified by the configuration server 112 (FIG. 1). FIG. 7 shows in further detail the acts that occur in step 416 of the embodiment described in relation to FIG. 4. At the step 700, the upgrade manager module 124 (FIG. 1) of the client computer 104 (FIG. 1) has received an upgrade response message from the component server 116.

Proceeding to a step 704, the upgrade manager module 124 (FIG. 1) analyzes the upgrade response message to determine whether the component server 116 was able to identify each of the requested components 102 (FIG. 1) and any other components that may be required for proper operation. If the upgrade manager module 124 determines that locations for all of the requested components could not be found, the upgrade manager module 124 proceeds to a step 708. At the step 708, the upgrade manager module 124 informs the user that upgrade failed. The process then ends in an end step 712.

Referring again to the decision step 704, if the upgrade manager module 124 determines that the upgrade request message has identified each of the components 102 (FIG. 1) including any necessary for proper operation, the upgrade manager module 124 proceeds to a step 716. During the steps 716, 720, 724, and 728, the upgrade manager module 124 performs an iterative process for downloading each of the components that have been identified by the component server 116. At the step 716, the upgrade manager module 124 downloads via the network 108 (FIG. 1) the first of the identified components. It will be appreciated by one of ordinary skill in the art that a number of methods exits for transmitting files across a network, e.g., HTTP, FTP, etc.

Continuing to a step 720, the setup manager module 124 authenticates the downloaded component. It is also to be appreciated that a number of methods exist for authenticating components. In one embodiment of the invention, the authentication process adheres to the Digital Signature Algorithm as defined by the National Institute of Standards and Technology (NIST). However, other forms of signature verification can be used such as ElGamal, Fiat-Shamir, or RSA.

Proceeding to a step 724, the upgrade manager module 124 decompresses the downloaded component. The present invention can be compatibly used with any off the shelf decompression, such as PKZIP by PKWARE, Inc., the Universal Distribution Coder by Intelligent Compression Technologies, BZIP, or IMP by Technelysium. It is also to be appreciated that the upgrade manager module 124 can be used with a proprietary protection scheme.

Moving to a decision step 728, the upgrade manager module 124 determines whether the current component is the last component identified in the upgrade response message. If additional components need to be downloaded, the upgrade manager module 124 returns to repeat the steps 716, 720, 724, and 728 with respect to another one of the components.

However, still referring to the decision step 728, if the upgrade manager module 124 determines that the last component has been downloaded, the setup manager module 126 proceeds to a step 732. At the step 732, the setup manager module 126 installs each of the downloaded components. To install each of the components, the setup manager module 126 moves the components to an appropriate location in the client computer 104, e.g., by copying files. Furthermore, if necessary, the setup manager module 126 registers the downloaded component with a component registry (not shown) that is associated with an operating system (not shown). The process flow then ends at the step 712.

The present invention advantageously allows users to upgrade software without knowing the hardware and/or software configuration of their computer. The system automatically downloads a software component and automatically selects the appropriate version of software that is compatible with the user's computer.

Further, the present invention allows for the association of an expiration time with the configuration files. If an expiration time is set, the component server can ensure that before a component is downloaded, the configuration file was recently supplied from a trusted configuration server. The use of the expiration time ensures that the user provides requested user information to the configuration server, and that the user did not get the configuration file from another computer outside of the control of the provider of the components.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A computer system for updating a software component on a client computing device, the system including:
   a client computing device operably coupled with a network, the client computing device configured to:
   request from a configuration computer an upgrade of the software component and to identify one or more client conditions including operating system components that are executing on the client computing device;
   receive from the configuration computer a configuration file corresponding to the requested upgrade;
   determine that at least part of the configuration file is not to be parsed by the client computing device and forward the configuration file to a component server; and
   obtain and install a plurality of components associated with the requested upgrade, the obtaining and installing being based upon an upgrade message received from the component server;
   a configuration computer configured to:
   receive the upgrade request; and
   responsively provide to the client computing device via the network the configuration file corresponding to the requested upgrade; and
   a component server coupled with the network and configured to:
   receive the configuration file and the one or more client conditions from the client computing device and responsively determine the plurality of components associated with the requested upgrade, the determining being based upon the configuration file and the one or more client conditions; and
   provide to the client computing device an upgrade message identifying the determined plurality of components.

2. The system of claim 1, wherein the client conditions include a user identification number that is associated with a user of the client computing device.

3. The system of claim 1, wherein the client conditions include a preferred language.

4. The system of claim 1, wherein the configuration computer is separate and distinct from the client computer device.

5. The system of claim 1 wherein the identified components comprise first components to be updated and at least one second component necessary for post-upgrade execution of the first component to be updated.

6. The system of claim 5 wherein the at least one second component is determined to not be present on the client computing device before the update.

7. A system for identifying components for installation, the system comprising:
   a configuration server having a processor, a computer readable storage medium, and a data communication subsystem, the configuration server configured to:
   maintain on the computer-readable storage medium a configuration file identifying one or more components for installation on a client computer; and
   transmit the configuration file via the data communication subsystem to a client computer;
   wherein at least part of the configuration file is not to be parsed by the client computer and comprises:
   a plurality of component identifiers, each of the component identifiers identifying at least one of said one or more components; and
   an expiration time identifying a time by which the components must be installed on the client computer.

8. The system of claim 7, wherein the configuration server is connected to the client computer via a network.

9. The system of claim 7, wherein the configuration file is a Java an archive file.

10. The system of claim 7, wherein the plurality of component identifiers comprise at least one first component identifier and at least one second component identifier for a component necessary for post-upgrade execution of a component identified by the at least one first component identifier.

11. The system of claim 10 wherein the second component identifier is for a component determined to be missing from the client computing device.

12. A data distribution network comprising:
   a client computer having a processor communicatively coupled to a first computer readable storage device having stored thereon a client profile indicating a system resource condition of the client computer and instructions that cause the processor to execute an upgrade manager; and
   a server computer communicatively coupled to the client computer via a network, the server computer associated with one or more installable software components, the server computer having a processor communicatively coupled to a second computer readable storage device having stored thereon instructions that cause the processor to:

receive a request for an upgrade of one or more of the software components from the client computer;
store and provide to the client computer a configuration file identifying at least one upgradable software component, the configuration file being at least partially not parsed by the client computer; and
execute an upgrade handler;
wherein the upgrade manager is configured to transmit information about the system resource condition of the client computer to the server computer via the network, the information about the system resource condition identifying software components of an operating system executing on the client computer; and
wherein the upgrade handler is configured to identify at least one upgradable software component requested by the client computer as a software component to be upgraded based upon the request and the system resource condition of the client computer including the identified software components of the operating system executing in the client computer.

13. The network of claim 12, wherein the upgrade manager parses the content of the configuration file and transmits the parsed content to the upgrade handler.

14. A system for installing one or more streaming-media-associated files on a client computing device, the system including:
a configuration computer communicatively coupled to a client computing device via the network to provide the client computing device with access to a configuration file identifying at least one operating system component executing on the client computing device as having an upgraded version available for download by the client computing device upon request, the configuration file being at least partially not parsed by the client computing device, the client computing device identifying one or more client conditions including operating system components that are executing on the client computing device; and
a component server for receiving a request from the client computing device requesting an upgraded version of the at least one operating system component as well as a representation of the one or more client conditions and the configuration file from the client computing device, and in response the component server identifying the location of one or more streaming media components other than the requested at least one of the operating system components, the streaming media components determined based upon the operating system components identified by the configuration file and based upon the client conditions, the component server further indicating the identified streaming media components to the client computing device to be obtained and installed by the client computing device.

15. The system of claim 14, wherein the configuration file identifies one or more streaming media components.

16. A method executing on a component server for locating a downloadable software component for installation on a client device:
receiving, by the component server from the client device via a network, a configuration file and a client profile, said configuration file being at least partially not parsed by the client device, said configuration file identifying a downloadable software component for installation on the client device, said client profile describing a plurality of client conditions of the client device;
determining that said configuration file includes an expiration time; and
verifying that said configuration file was supplied by a trusted configuration server and that said expiration time has not passed;
identifying, by the component server, a plurality of versions of said downloadable software component that are available for download from a download server via said network;
determining, by the component server, which of said plurality of versions of said downloadable software component is appropriate according to said plurality of client conditions of the client device;
identifying, by the component server, a location of said appropriate version of said downloadable software component on said download server;
sending, by the component server via said network, said location of said appropriate version of said downloadable software component to the client device.

17. The method of claim 16, said configuration file having been generated for the client device by a configuration server.

18. The method of claim 16, said configuration file having been generated for a second client device by a configuration server.

19. A computer system for updating one or more components on a client computing device, the system including:
a client computing device operably coupled with a network, the client computing device configured to identify the one or more components to be updated and one or more client conditions including operating system components that are executing on the client computing device;
a configuration computer, the configuration computer configured to provide to the client computing device via the network a configuration file identifying at least one of the operating system components, wherein at least part of the configuration file is not to be parsed by the client computing device; and
a component server coupled with the network and configured to receive the configuration file from the client computing device and to responsively identify one or more components to be installed on the client computing device, the identifying being based upon components to be updated and identified by the configuration file, and the identified components comprising the components to be updated and identified in the configuration file and further comprising at least one second component necessary for post-upgrade execution of the first component to be updated.

20. The computer system of claim 19, wherein the at least one second component is determined not to be present on the client computing device before the update.

21. A system for identifying components for installation, the system comprising:
a configuration server having a processor, a computer readable storage medium, and a data communication subsystem, the configuration server configured to maintain on the computer-readable storage medium a configuration file identifying one or more components for installation on a client computer; and
transmit the configuration file via the data communication subsystem to a client computer upon a user request for the configuration file;
wherein at least part of the configuration file is not to be parsed by the client computer and comprises:
a plurality of component identifiers, each of the component identifiers identifying at least one of said one or more components, and comprising at least one first component identifier and at least one second component identifier for a component necessary for post-upgrade execution of a component identified by the at least one first component identifier; and an expiration time identifying a time by which the components must be installed on the client computer.

22. The system of claim 21, wherein the second component identifier is for a component determined to be missing from the client computing device.

* * * * *

UNITED STATES PATENT AND TRADEMARK OFFICE
CERTIFICATE OF CORRECTION

PATENT NO. : 7,844,963 B2
APPLICATION NO. : 11/419700
DATED : November 30, 2010
INVENTOR(S) : Brad Pitzel and Stanizlav Bobrovskiy It is certified that error appears in the above-identified patent and that said Letters Patent is hereby corrected as shown below:

Column 12, line 45 "a Java an archive file." should be changed to --an archive file.--.

Column 13, line 44-45 "and in response the component server identifying the location of one or more streaming media components" should be changed to --and in response the component server identifying one or more streaming media components--.

Signed and Sealed this
Nineteenth Day of April, 2011

David J. Kappos
*Director of the United States Patent and Trademark Office*